Oct. 4, 1938.  D. D. PEEBLES ET AL  2,131,902
FISH COOKING APPARATUS AND METHOD
Filed Aug. 5, 1930  10 Sheets-Sheet 9

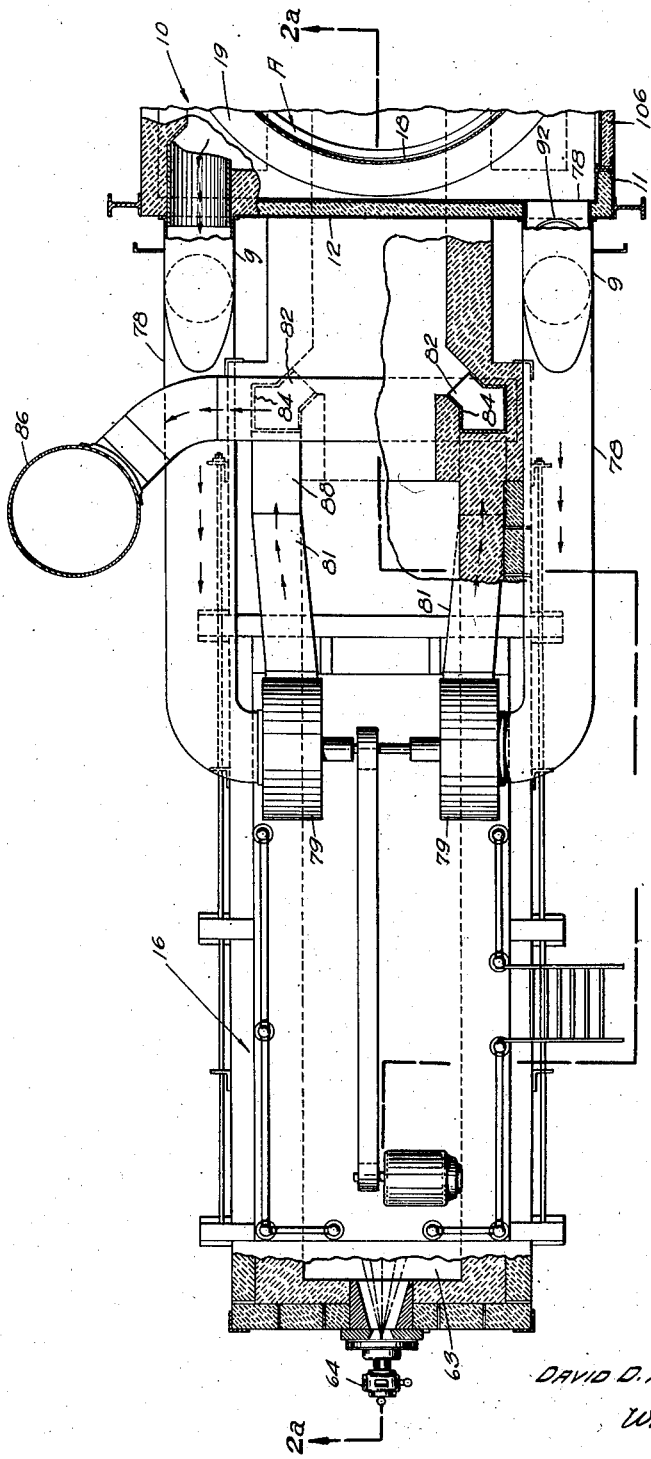

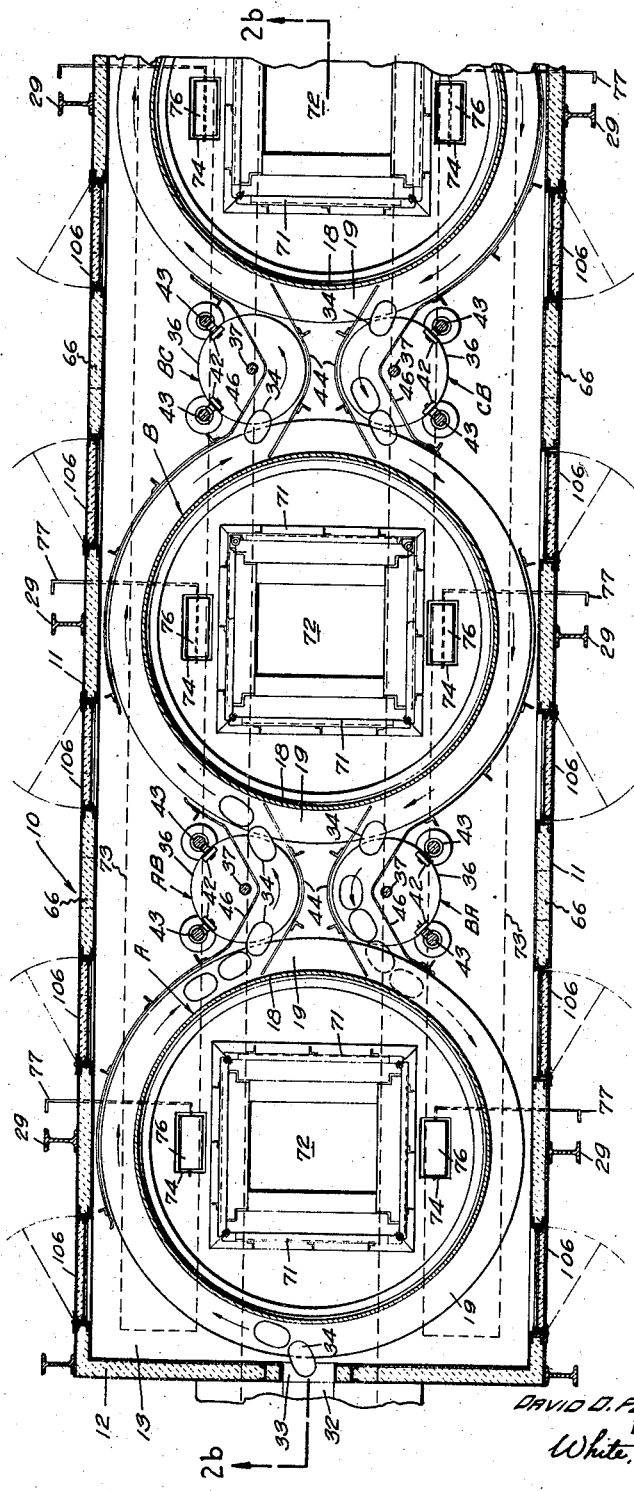

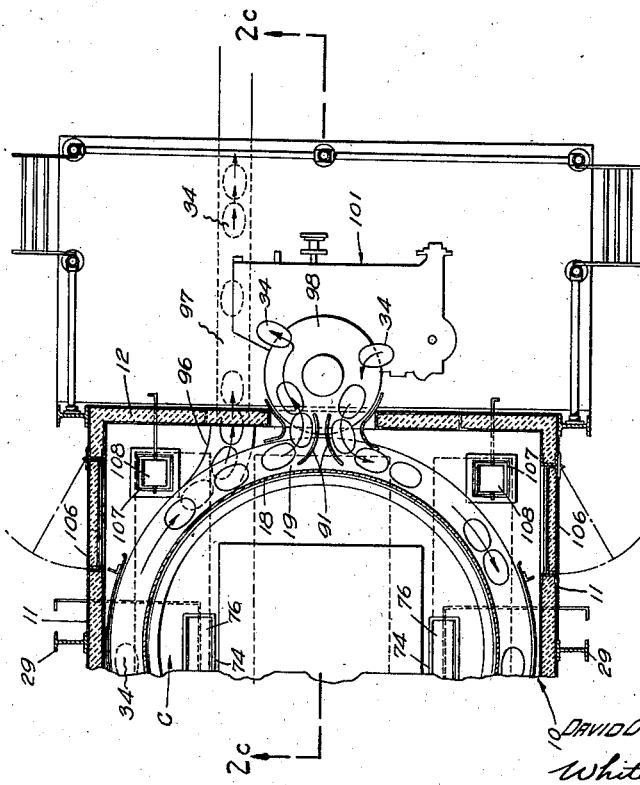

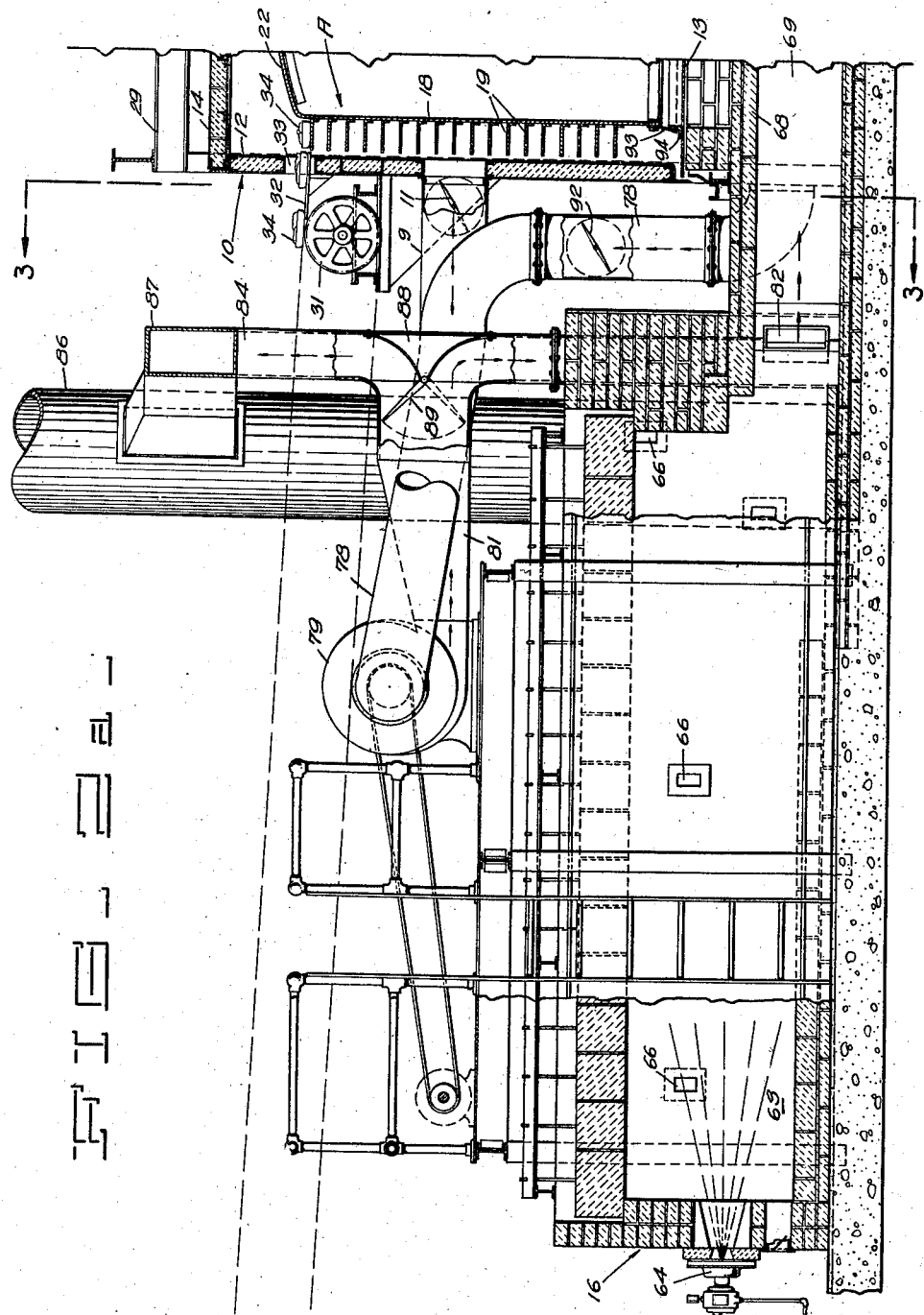

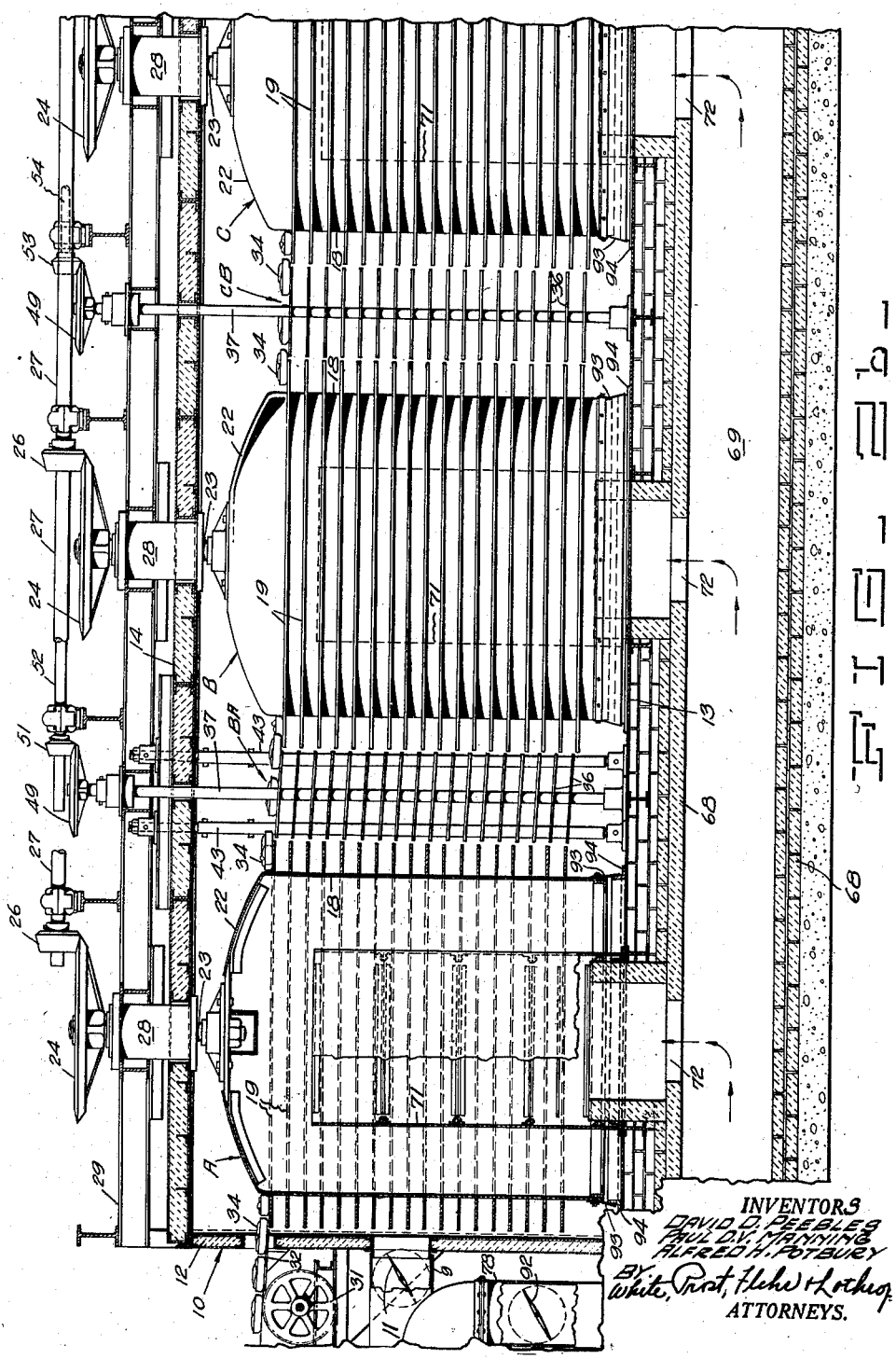

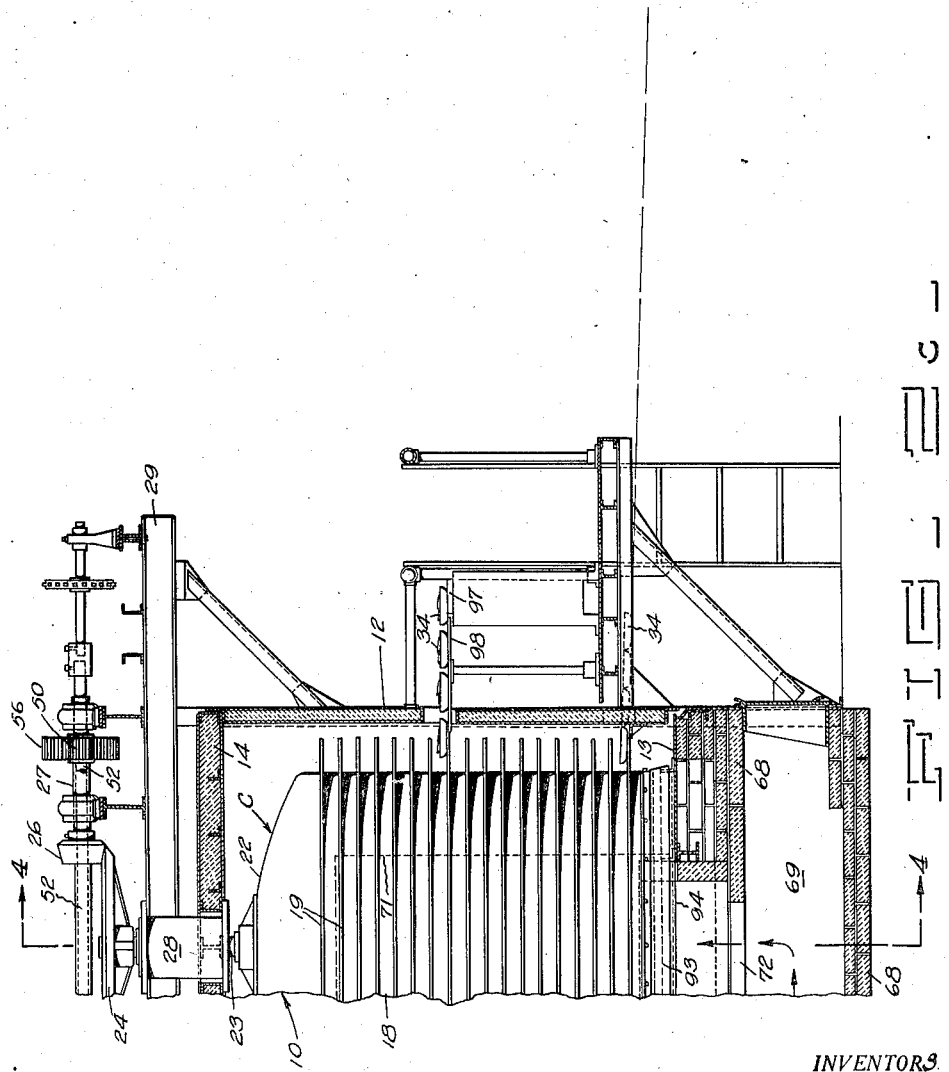

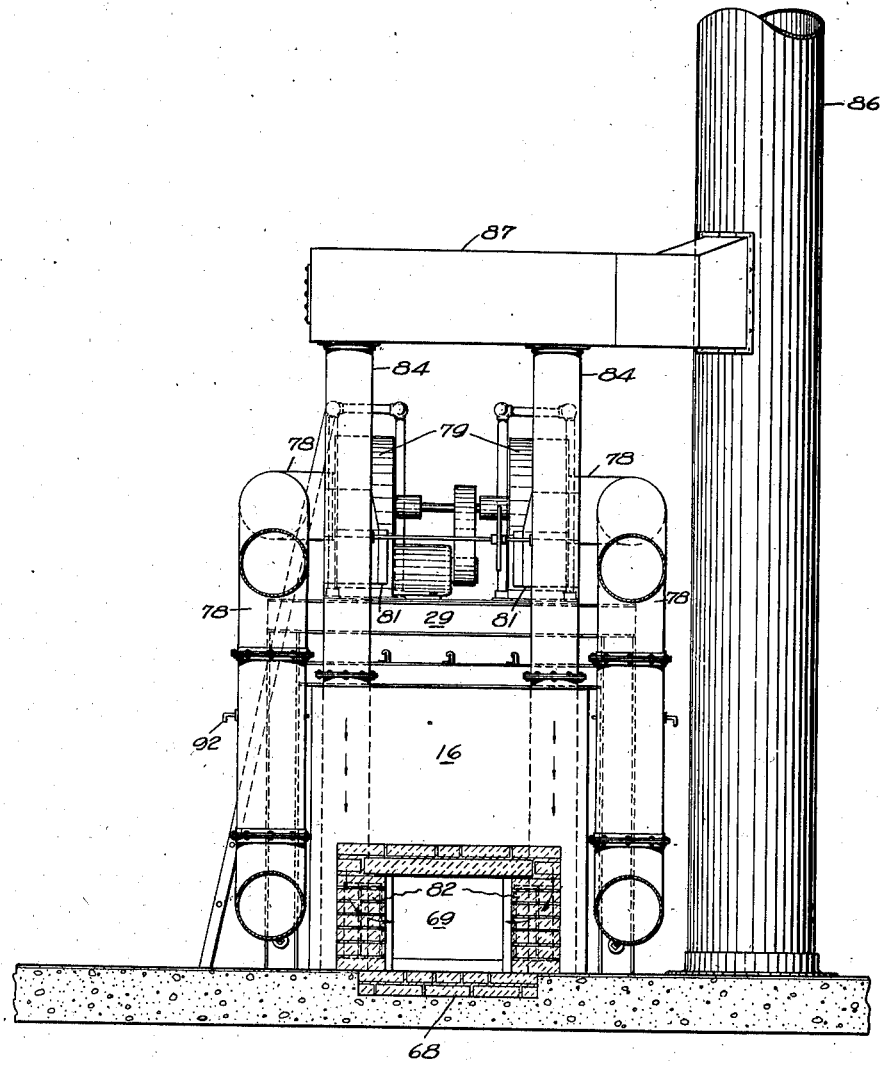

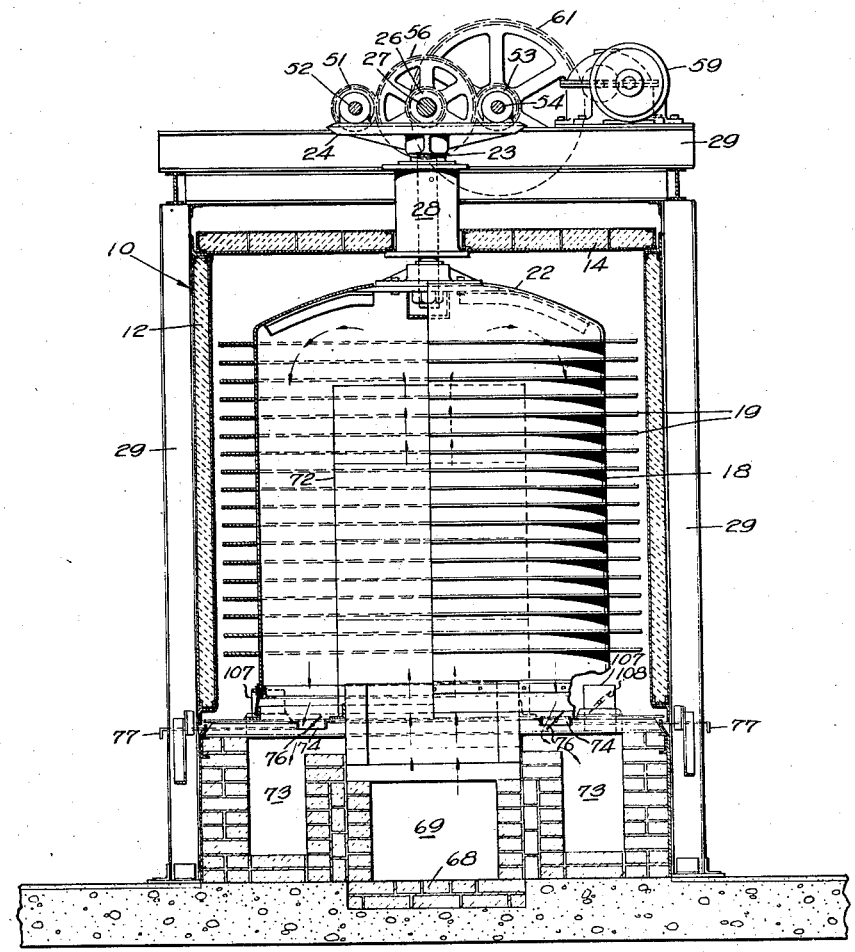
FIG_4_

INVENTORS
DAVID D. PEEBLES
PAUL D. V. MANNING
BY ALFRED H. POTBURY
White, Prost, Hehr & Lothrop
ATTORNEYS.

Oct. 4, 1938.  D. D. PEEBLES ET AL  2,131,902
FISH COOKING APPARATUS AND METHOD
Filed Aug. 5, 1930     10 Sheets-Sheet 10
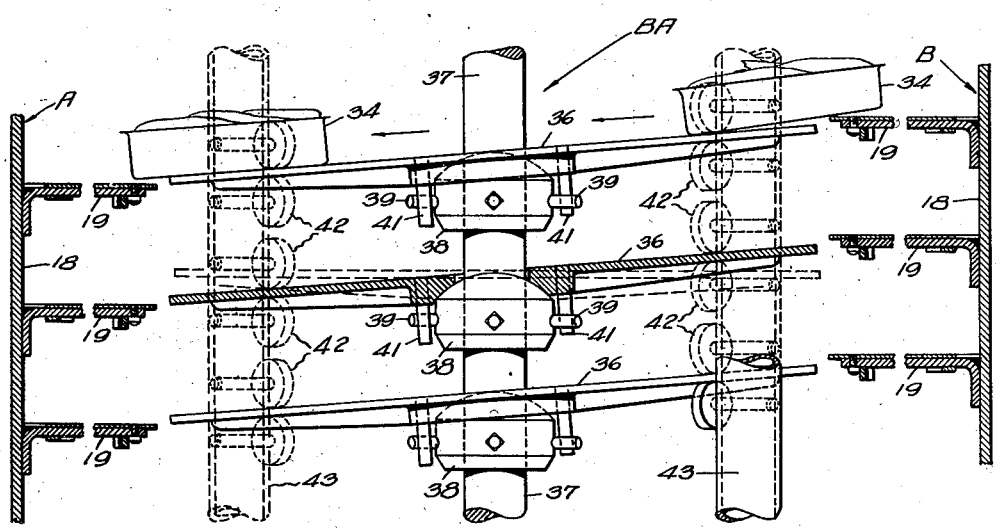
FIG_6_
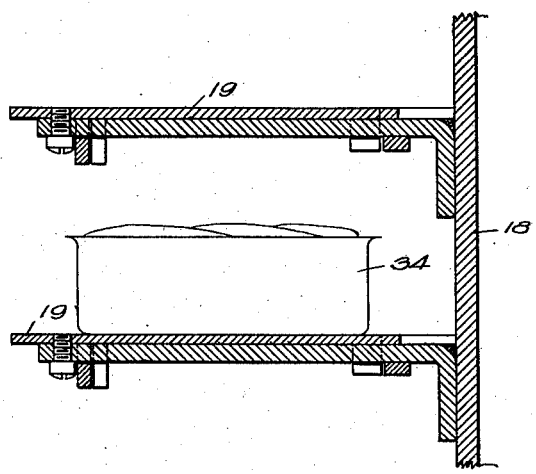
FIG_7_
INVENTORS
DAVID D. PEEBLES
PAUL D. V. MANNING
BY ALFRED H. POTBURY
White, Prost, Flehr & Lothrop
ATTORNEYS.

Patented Oct. 4, 1938

2,131,902

UNITED STATES PATENT OFFICE 2,131,902

FISH COOKING APPARATUS AND METHOD

David D. Peebles, Eureka, Paul D. V. Manning, Berkeley Woods, and Alfred H. Potbury, Berkeley, Calif., assignors, by direct and mesne assignments, to F. E. Booth Company, Inc., San Francisco, Calif., a corporation of Nevada Application August 5, 1930, Serial No. 473,178

5 Claims. (Cl. 99—188)

This invention relates generally to apparatus and methods for effecting cooking operations, particularly the cooking of fish in canneries.

It is a general object of the present invention to devise an apparatus and method of the above character which will make possible a relatively high yield of valuable oil from the fish being treated.

It is a further object of the invention to devise a fish cooking apparatus and method which will secure a better quality finished product which is relatively more palatable and digestible, and which will have the skin of the fish substantially intact.

It is a further object of the invention to devise fish cooking apparatus which will have a relatively high capacity for a given amount of space occupied.

It is another object of the invention to construct a fish cooking apparatus which is automatic in its operation, and which will serve to store fish within a cooking chamber for a predetermined cooking period.

It is a further object of this invention to devise a method making possible a "grilled" or "broiled" canned fish product.

Further objects of the invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings:

Figures 1a, 1b and 1c taken together illustrate in cross sectional plan, a machine incorporating principles of the present invention.

Figs. 2a, 2b and 2c, taken together, form a cross sectional side elevational view of the apparatus illustrated in Figs. 1a, 1b and 1c. Figs. 2a, 2b and 2c are taken respectively along the lines 2a—2a, 2b—2b, and 2c—2c of Figs. 1a, 1b and 1c respectively.

Fig. 3 is a cross sectional detail taken along the line 3—3 of Fig. 2a.

Fig. 4 is a cross sectional detail taken along the line 4—4 of Fig 2c.

Fig. 6 is a detail view partly in cross section, illustrating a preferred construction for the transfer means which we prefer to employ.

Fig. 7 is an enlarged detail view in section showing the shelving construction.

Figure 5:
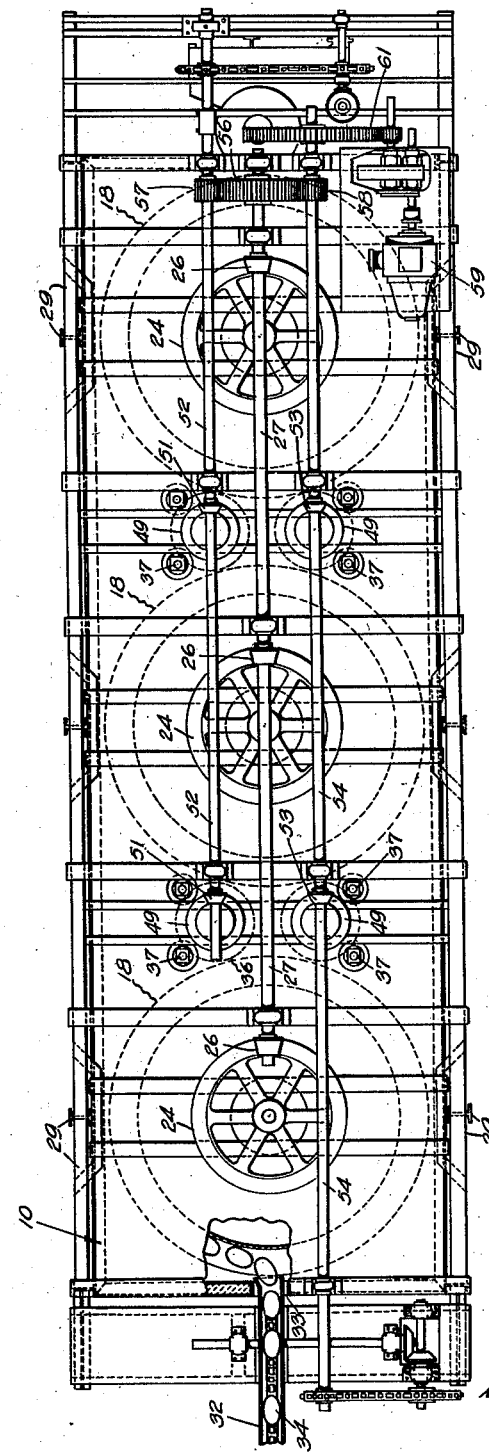
Fig. 5 is a plan view on a reduced scale illustrating the structure forming the cooking chamber.

While the invention as disclosed herein resides in both an apparatus and method, the method can best be explained by a detailed description of the preferred apparatus and its mode of operation. The apparatus is designed for use in canneries for the treatment of small fish, commonly termed sardines, whereby valuable fish oil is recovered and the flesh of the fish is cooked to produce an edible product. Within the cooking chamber of the apparatus to which cans containing the fish can be continuously delivered, the cans are stored for a predetermined cooking period, and are then discharged to suitable machinery for applying and sealing the lids to the cans. During this treatment the oil rendered from the fish is drained from the cans.

Referring to Figs. 1a, 1b and 1c, and also Figs. 2a, 2b, and 2c of the drawings, the chamber in which the cooking of the fish takes place is formed by a suitable structure 10. This structure is formed by the side walls 11, end walls 12, bottom wall 13, and top wall 14. It is evident that these walls can be formed in any suitable manner; for example as indicated the side, end, and top walls can be made of suitable structural steel members carrying spaced metal plates, the plates being separated by heat insulating material. As a means for supplying heat to structure 10, we provide a suitable furnace indicated generally at 16, which will be presently described in detail.

The means which we utilize within structure 10 to handle and store cans of fish during a cooking period, has been designed to provide relatively high capacity for a given amount of space, and in order to subject the fish to our novel cooking method. The preferred manner of accomplishing these results is to utilize an arrangement of shelving within structure 10 which is adapted to receive and support a relatively large quantity of cans, and the cans upon this shelving are continually moved thru a predetermined non-linear path, until the end of the predetermined cooking period. This shelving is preferably incorporated in a plurality of units, identified as A, B and C. Each unit can conveniently consist of a drum 18 made of suitable material such as sheet metal, having a plurality of spaced superposed shelves 19 mounted upon the periphery of the same. The shelves extend circumferentially about the drums as is shown in Fig. 1b and are made of material having good heat conductivity such as metal.

As shown in Fig. 2b, units A, B and C are mounted to rotate about spaced vertical axes. Thus each drum 18 is provided with an upper end wall or head 22, to which an upright concentric shaft 23 is secured. Shafts 23 extend upwardly thru the upper wall 14, and are operably connected to suitable drive means, such as represented by bevel gears 24 and 26 driven by a countershaft 27. It is evident that with this drive connection, rotation of countershaft 27 drives the units A, B and C in synchronism. Shafts 23 serve to carry the weights of their respective rotatable units, and they are therefore shown associated with suitable journals 28, these journals being supported by structure 29 overlying the upper wall 14. Journals 28 are preferably water cooled so as not to be detrimentally affected by heat.

In order to supply cans containing fish to the shelves 19 so that the apparatus can operate automatically, we have indicated conventional means such as an endless conveyor, one end of which is carried by sprocket 31 (Fig. 2a). A small chute 32 serves to deliver cans from the end of this conveyor, to the uppermost shelf of unit A, thru an opening 33. As will be presently explained, when in operation the open cans 34 within which fish is packed are delivered thru opening 33 and are disposed one behind the other upon the uppermost shelf 19 of unit A, as shown in Fig. 1b.

In order to utilize the available storage space provided by shelves 19 of the different units A, B and C, and in order to extend the cooking period and make it continuous, we provide transfer means which serve to transfer cans 34 between the different units A, B and C, and which also serve to transfer the cans to the different shelves of each unit. As shown in Figs. 1b and 2b, it is convenient to divide the transfer means into a plurality of units, these units in this instance being identified as AB, BC, CB and BA. Unit AB serves to transfer cans between the rotatable units A and B, unit BC transfers from unit B to unit C, unit CB transfers from C to B, while unit BA transfers from B back to the original unit A. A suitable construction for each transfer unit is to provide a plurality of superposed discs 36 carried by an upright rotatable shaft 37. As shown in Fig. 6, each disc 36 may be loosely disposed upon shaft 37 so as to rest upon a collar 38 fixed to the shaft. Pins 39 projecting from collar 38 serve to engage pins 41 extending downwardly from disc 36, so as to form a loose driving connection. Such a driving connection between disc 36 and shaft 37 is desirable in that it permits these discs to transfer cans from one level to another, as for example from a shelf at one level to another shelf at a different level. It may be explained at this point that the shelving on units A and B is preferably disposed so that, relative to the spacing between the shelving, the uppermost shelf of unit B is nearly one-half space lower than the uppermost shelf of unit A. Therefore in passing over the transfer unit AB, assuming a movement of cans as indicated by the arrows in Fig. 1b, the cans are lowered nearly one-half of a shelf space, and a subsequent lowering of the cans is effected in transferring from unit B to unit A over the transfer unit BA. Therefore as shown in detail in Fig. 6, which in this case represents transfer unit BA, the discs are constrained to rotate in planes parallel to each other but at an angle differing from 90 degrees with respect to the axis of drive shaft 37. This result can be accomplished by the use of suitable guide rollers 42 engaging the peripheral portions of discs 36. These guide rollers can be conveniently mounted upon suitable upright support members 43. Assuming in Fig. 6 that the cans are being transferred from unit B to the transfer discs 36, the edges of the discs adjacent the edges of shelf 19 of unit B are set slightly lower than the adjacent edges of the shelves, so that the cans 34 move readily upon the surfaces of the discs. Similarly to facilitate transfer of the cans from discs 36 to shelves 19 of unit A, the edges of disc 36 adjacent the edges of shelves 19 of unit A, are set at a slightly higher level. In order to cause proper movement of the cans across each transfer disc, we preferably provide suitable guide members 44 and 46. If the apparatus is properly constructed, it is practical to omit the outer guide members 46. In the preferred manner of constructing the apparatus, the shelves of unit C are set at only a slightly lower level than the shelves of unit B, so that transfer unit BC may have its discs rigidly secured to its corresponding shaft 37. Because of the slight difference in the levels of the shelves of units B and C, the discs of transfer unit CB must be tilted a certain amount with respect to the horizontal, so that as the cans pass across the discs of this unit they are elevated a certain amount to be properly delivered to the shelves of unit B.

To clarify the apparatus thus far described, it may be explained at this time that the path of the cans moving over units A, B and C is as follows: As the cans are received one after the other upon the uppermost shelf of unit A, they are carried about one side of the axis of this unit, as indicated by the arrows in Fig. 1b, until they reach the transfer unit AB. They are then carried across the uppermost disc of this transfer unit and are delivered to the uppermost shelf of unit B. After being carried about one side of the axis of unit B, the cans are delivered by the uppermost disc of transfer unit BC, to the uppermost shelf of unit C. After moving substantially about the axis of unit C, the cans are delivered by the uppermost disc of transfer unit CB back to the uppermost shelf of unit B, and upon this shelf they are moved about the axis of unit B to the uppermost transfer disc of transfer unit BA. Transfer unit BA serves to discharge the cans to the second shelf of unit A. The cans delivered to the second shelf of unit A move substantially entirely about the axis of unit A untill they are delivered to the second transfer disc of transfer unit AB. From this second transfer disc the path of the cans can be traced along the second shelf of unit B, the second disc of transfer unit BA, the second shelf of unit C, the second disc of transfer unit CB, the second shelf of unit B, to the second disc of transfer unit BA, which then delivers the cans to the third shelf of unit A. Therefore a given can travels from one shelf of unit A to unit C, and then back again to the next lower shelf of unit A. Within a given time period it is apparent that a can entering the cooking chamber upon the uppermost shelf of unit A, will reach the lowermost shelf of unit C, and it is from this lowermost shelf that the can is preferably finally discharged from the cooking chamber. Likewise assuming that the cans are delivered to the uppermost shelf of unit A in close succession, in time all of the shelves of units A, B and C will contain cans, and thereafter cans can be continually removed from the lowermost shelf of unit C.

The above described mode of operation requires proper coordination of the transfer means with the units A, B and C. Therefore the transfer discs must be driven in synchronism and at a proper rate to transfer the cans without crowding or blocking. As an example of suitable drive means, we have shown the shafts 37 of the different transfer units extending upwardly thru the upper walls 14, and provided at their upper ends with suitable gears 49. The gears 49 of units AB and BC operably engage gears 51 carried by a countershaft 52, and correspondingly the gears 49 of transfer units BA and CB operably engage gears 53 carried by countershaft 54. To positively drive the transfer discs at a predetermined synchronous rate with respect to the rate of rotation of units A, B and C, countershaft 27 is shown provided with a gear 56, which engages pinions 57 and 58 fixed to shafts 52 and 54 respectively. As a suitable source of power, there is shown an electric motor 59, which is preferably of the variable speed type, and the shaft of this motor is operably connected to shaft 54 by gearing 61. The speed at which motor 59 is operated determines the length of the cooking period, and also influences the capacity of the apparatus. At maximum capacity the speed of motor 59 is at a maximum speed consistent with proper cooking of the fish, and the cans are continually delivered to the first shelf of unit A in close succession.

It will be noted that the shelves 19 serve the function of supporting and carrying the cans thru a non-linear and circuitous path thru the interior of structure 10, whereby a large number of cans are stored within the apparatus during a cooking period. These shelves also serve a useful function in effecting transfer of heat to the fish within the can, as will be presently described, and to enable them to perform this function they are heated to such a degree that a substantial amount of heat dissipated from the same is in the form of heat of radiation. In order to impart heat to shelves 19, we prefer to pass hot gas thru the drum 18, this gas being produced by the furnace 16. While the construction of the furnace may vary, the particular form shown (Fig. 2a), consists of a combustion chamber 63 formed by suitable refractory walls. Suitable means such as fuel oil burner 64 supplies a combustible mixture to the combustion chamber, while tuyères 66 supply sufficient air to support combustion. A refractory structure 68 extending beneath units A, B and C, forms a passageway 69 communicating with combustion chamber 63, and thru which the hot gaseous products of combustion are caused to flow.

Extending upwardly within each drum 18 and concentrically with respect to the axis of the same, there is a conduit 71, this conduit having an upper open end and having its lower end fixed to bottom wall 13. Passageway or opening 72 serves to permit flow of hot gas from conduit 69 upwardly thru conduit 71. In order to establish a continual flow of hot gas thru drums 18 the refractory structure 68 extending below the apparatus is provided with additional separate longitudinal passages 73 (Fig. 1b). These side passages 73 communicate with the spaces between conduit 71 and drum 18, thru the opening 74 (Fig. 10b). Suitable butterfly valves 76 can be provided for controlling openings 74, these valves being adjustable by means of rods 77 extending thru the side walls 11. At that end of the structure 10 which is adjacent furnace 16, the ends of passages 73 communicate with conduits 78, these conduits in turn communicating with the intakes of suitable fans or blowers 79. The outflow conduits 81 of blower 79 discharge back into passageway 73, thru the discharge openings 82, (Figs. 1a and 2a). Discharge openings 82 are directed away from the combustion chamber 63, so as to tend to induce a flow of gas from the combustion chamber thru conduit 69.

With the connections for the conduit and blowers 79 described above, it is evident that hot gaseous products of combustion from the chamber 63 are caused to flow thru longitudinal passageway 69, and upwardly thru the conduits 71 of the units A, B and C. The hot gases are thus delivered to the upper portions of drums 18, and are then caused to flow downwardly thru the spaces between conduits 71 and the inner walls of drums 18, to be withdrawn thru openings 74 and returned to the intakes of fans 79. A portion of the heat of the gases blowing thru the units A, B and C is absorbed by the drums 18, and is conducted to the metal shelves 19. Maintaining the drums and the shelves at an elevated temperature also causes the atmosphere within the structure 10 surrounding the units A, B and C to be heated to an elevated temperature although to a somewhat lesser degree than the temperature of drums 18 and shelves 19. A portion of the hot gas or gaseous products removed from drums 18 is discharged thru conduits 81 and again recirculated, thus efficiently utilizing the heat of the gas, while a portion is discharged to the atmosphere. The discharge to the atmosphere can be effected by providing conduit 84 (Fig. 3), which communicates with a stack 86 thru the header conduit 87. Conduit 84 communicates with the discharge conduits 81 from blower 79 thru the T connection 88. A suitable adjustable valve 89 makes it possible for an operator to adjust the proportions between the quantity of gas discharged into stack 86 and the quantity of gas returned into the system thru opening 82. The circulation of hot gas can also be adjusted to a certain extent by providing adjustable valves 92 in conduit 78.

In many instances it is preferable to substantially prevent flow of gas from the interior of drums 18, directly to the space surrounding these drums. Therefore it is preferable to employ suitable sealing means about the bottom edges of drums 18, such as is afforded by a flexible flap 93 depending from the lower edge of each drum, this flap serving to engage a circular flange 94 fixed to bottom wall 13.

As has been previously explained, the cans at the end of a cooking period can be conveniently removed from the bottom shelf of unit C. As representative of suitable means for effecting automatic removal of the cans, we have indicated a suitable guide chute 96 (Fig. 1c) which serves to divert the cans from the lowermost shelf of unit C and to deliver them thru a suitable opening in the end wall of structure 10, from which they can be picked up by suitable conveying means 97. The cans delivered at this point are introduced into a suitable machine, which applies and seals the lids to the cans. However before the cans are sealed, it is preferable to drain oil and other liquid from the cans, which can be accomplished by suitable machines well known in the art.

With respect to the recovery of oil rendered from the fish, it has been found that a materially higher yield can be obtained if oil is also drained from the cans as an intermediate step in the cooking period, that is after the beginning of but before the end of the cooking period. We therefore preferably interrupt the cooking period by a step in which the cans are inverted to effect drainage of oil and other liquids. As shown in Fig. 1c, we provide a transfer disc 98 which cooperates with one of the intermediate shelves of unit C, say a shelf located about half way down the corresponding drum 18. Suitable guide means 99 serve to divert or shunt cans carried by this particular shelf upon one side of disc 98, and from this disc the cans are successively delivered to a machine 101, which serves to invert the cans and thus drain oil and liquid from the same. From machine 101 the cans after drainage are redelivered to the other side of disc 98, from which they are again transferred back into the cooking chamber upon the same shelf of unit C. Disc 98 is of course driven at a suitable rate, in synchronism with the rotation of unit C. Drainage of the cans as an intermediate step not only tends to increase the yield of valuable oil, but it also removes a certain quantity of water which is generally present within the cans. Removal of water at this point tends to increase the efficiency of the apparatus, since this water would otherwise be evaporated during the remaining portion of the cooking period, thereby wasting some of the heat.

The novel cooking method effected by the above described apparatus, can be explained by reference to Fig. 7. In this figure we have indicated an open can 34 containing fish, which is disposed between two superposed shelves 19 as in normal operation of our apparatus. As has been previously explained, the walls of drum 18 are heated to a relatively high temperature by the gaseous products of combustion flowing thru the same, and heat from the walls of this drum is conductively transferred to the metal shelves 19. These shelves therefore form heated surfaces, one of which is disposed adjacent to and directly above the open can 34, and the other of which serves to support and therefore is in direct conductive contact with the lower surface of the can. The one shelf therefore serves to aid in the cooking operation, by directly conducting heat to the contents of the can, while the heated surface formed by the shelf directly above the can, which also serves as a support for the cans in the next succeeding level, serves to radiate heat to the exposed surfaces of the fish. With respect to the use of radiant heat as a substantial factor in effecting cooking of the fish, the present method is claimed generically in Peebles Patent No. 1,677,364. However in addition to the use of radiant heat as a substantial factor in the cooking of the fish, the present method also utilizes heat directly conducted to the can and its contents from the shelf supporting the same, as disclosed in Peebles and Mullins application Ser. No. 286,854, and also to a certain extent heat from the surrounding heated gaseous atmosphere. This novel method of cooking can be described as being a "grilling" or "broiling" action. The final product is more nutritious and palatable than fish cooked by prior methods, as for example by frying the fish in oil. Furthermore it serves to more effectively render the oil from the fish, thus making possible a maximum yield of valuable oil. It is also characteristic of the method that the skin of the fish becomes set during the first part of the cooking period, so that the skin of the final product is not mutilated. In connection with cooking by this method, it may be noted that we prefer to pack the fish within the cans prior to their introduction into the apparatus, with the dark backs of the fish uppermost. This positioning of the fish permits the cavities of the individual fish to drain more readily, and the dark exposed surfaces more readily absorb radiant heat. Furthermore when the fish are being removed from the cans, after the lid of the can has been cut away, the contents of the can can be inverted upon a plate with the light surfaces uppermost, thus presenting an attractive appearance.

To review briefly the operation of the complete apparatus, open top cans packed with fish to be cooked are continually delivered one behind the other, to the uppermost shelf of unit A. Upon being delivered to the uppermost shelf of this unit, the cans are carried about in the arc of a circle and are then transferred by unit AB, to the uppermost shelf of unit B. After traveling thru the arc of a circle about the axis of unit B, they are delivered by transfer device BC to the uppermost shelf of unit C. Unit C also carries the cans about an arc of a circle and reverses their direction towards unit B. After being delivered to transfer device CB, the cans are returned to the uppermost shelf of unit B, and by transfer device BA, they are delivered to the second shelf of unit A. Thus the cans are successively transferred between the shelves of units A, B and C and are caused to pass back and forth over successively lower paths. During these movements of the cans, the fish are being cooked as has been previously described. The cooking period is interrupted by delivery of the cans to machine 101, which serves to drain oil and liquid from the same. At the end of the cooking operation the cans are delivered to conveyor 97, again drained of their liquid contents, and then sealed.

It is evident that the invention can be modified in many ways within the spirit of the present invention. For example although the manner of supporting the shelving gives good results and is therefore preferred, various other means can be employed for supporting the shelving and for effecting their movement to carry the cans thru a predetermined path. If it is desired to construct a cooking apparatus having greater capacity, a greater amount of shelving can be employed, or more than three units carrying shelving can be provided. Likewise if the capacity of the apparatus need not be so great, less than three of the rotatable units carrying shelving can be employed, or only one unit A can be employed together with transfer means for progressively transferring cans from a given shelf to a next succeeding lower shelf. It is also evident that certain refinements can be made to facilitate maintenance of the apparatus in proper working condition, or to facilitate repairs. For example the side walls 11 of the structure 10 can be provided with doors 106 to provide ready access into the cooking chamber. Furthermore suitable signal or alarm means can be employed to indicate improper operation of certain of the moving parts, as for example the transfer discs. It is also possible to provide means for circulating hot gases thru the cooking chamber, that is thru the enclosed space surrounding units A, B and C. Thus at that end of structure 10 which is remote from furnace 16, we have shown openings 107 communicating between the cooking chamber and which communicates with longitudinal passageways. Introduction of hot gases from longitudinal passageways thru openings 106 can be controlled or adjusted by valves 108. Since hot gases introduced in this manner are gases of combustion, they are relatively inert and therefore maintenance of such an atmosphere in the cooking chamber tends to minimize oxidation of the fish being cooked. To effect a circulation of such gas thru the cooking chamber, the end of structure 10 remote from conduits 106 can be connected to conduits 78 by conduits 109, these latter conduits being controlled by valves 111.

We claim:

1. In fish cooking apparatus, a structure forming a chamber, a plurality of superposed supporting shelves within the chamber adapted to receive cans of fish, means for cyclically moving said shelving, and transfer discs for transferring cans between shelves at different levels.

2. The method of treating fish and the like which comprises packing the fish in open cans, subjecting the upright packed cans to heat treatment to liberate oil therefrom, which oil is retained by the cans, tilting the cans to effect drainage of oil therefrom, then subjecting the upright packed cans to heat treatment to substantially complete cooking of the flesh, and thereafter draining and closing the cans.

3. The method of treating fish and the like which comprises packing them in open cans, subjecting the upright packed cans to heat treatment to liberate oil therefrom, which oil is retained by the cans together with water, tilting the cans to effect drainage of oil and water therefrom, then subjecting the upright packed cans to heat treatment to substantially complete cooking of the flesh, and thereafter draining and closing the cans.

4. The method of treating fish and the like which comprises packing them in open cans, subjecting the upright packed cans to heat treatment to liberate oil therefrom, which oil is retained by the cans, tilting the cans to effect drainage of oil therefrom, then subjecting the upright packed cans to heat treatment to substantially complete cooking of the flesh, and thereafter draining and closing the cans, the heat treatment after the first-mentioned draining step serving to sear the exposed surfaces of the fish.

5. The method of treating fish and the like which comprises packing them in open cans, subjecting the upright packed cans to heat treatment to liberate oil therefrom, which oil is retained by the cans together with water, tilting the cans to effect drainage of oil and water therefrom, then subjecting the upright packed cans to heat treatment to substantially complete cooking of the flesh, and thereafter draining and closing the cans, the heat treatment after the first-mentioned draining step serving to sear the exposed surfaces of the fish.

DAVID D. PEEBLES.
PAUL D. V. MANNING.
ALFRED H. POTBURY.